Patented Nov. 23, 1948

2,454,629

UNITED STATES PATENT OFFICE 2,454,629

POLYMETHINE DYES

Leslie G. S. Brooker, Rochester, N. Y., assignor to Eastman Kodak Company, Rochester, N. Y., a corporation of New Jersey No Drawing. Application January 27, 1940, Serial No. 316,002

5 Claims. (Cl. 260—240)

This invention relates to polymethine dyes and to a process for preparing the same.

During the last few years, dyes of a new kind, which have come to be known as merocyanine dyes and which have been found to sensitize photographic silver halide emulsions, have been made available. See United States Patent 2,078,233, dated April 27, 1939, and United States Patent 2,165,338, dated July 11, 1939, for example. A number of these new merocyanine dyes contain the atomic grouping:

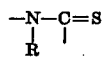

wherein R represents an alkyl or an aryl group.

I have now found that merocyanine dyes containing the aforesaid atomic grouping can be quaternarized to give quaternary salts of considerable utility as intermediates for the preparation of dyes of a more complex character. I have found that certain of these new quaternary salts have some sensitizing action on photographic silver halide emulsions, and that the dyes of a more complex character obtainable therefrom, have a much more marked sensitizing action on photographic silver halide emulsions.

It is, accordingly, an object of my invention to provide new quaternary salts and new dyes obtainable therefrom. A further object is to provide a process for preparing such new quaternary salts and for preparing such new dyes. A further object is to provide new sensitized photographic emulsions. Other objects will become apparent hereinafter.

In accordance with my invention, I take any merocyanine dye containing the atomic grouping:

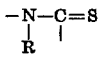

wherein R represents an alkyl or an aryl group, and quaternarize the dye with an ester. The merocyanine dyes containing the aforesaid atomic groups and which I employ in my invention can be represented by the following general formula:

I.

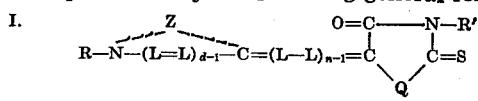

wherein $d$ represents a positive integer of from one to two, $n$ represents a positive integer of from one to three, L represents a methine group, R represents an alkyl group, such as methyl, ethyl, β-hydroxyethyl, benzyl, allyl or carbethoxymethyl, for example, R' represents an alkyl group such as indicated for R for example, or an aryl group, such as phenyl, p-chlorophenyl or naphthyl for example, Q represents oxygen, sulfur, an alkylimino group (e. g. methylimino or benzylimino) or an arylimino group (e. g. phenylimino or naphthylimino) and Z represents the non-metallic atoms necessary to complete a heterocyclic organic nucleus; such as (when $d$ equals one) an oxazole nucleus (e. g. 4-methyloxazole, 4-phenyloxazole, benzoxazole or naphthoxazole), a thiazole nucleus (e. g. 4-methylthiazole, 4-phenylthiazole, benzothiazole or naphthothiazole), a selenazole nucleus (e. g. 4-methylselenazole, 4-phenylselenazole or benzoselenazole), a thiazoline nucleus, a quinoline nucleus or a pyridine nucleus for example, and such as (when $d$ equals two), a pyridine or a quinoline nucleus for example.

The quaternary salt substances formed by quaternarization of the dyes of Formula I above can be represented by the following general formula:

II.

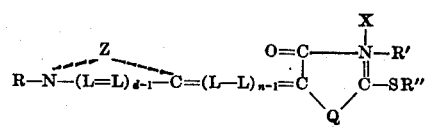

wherein $d$, $n$, L, Q, R, R' and Z have the values denoted above under formula I, and R" represents the alcohol radical of an ester and X represents an acid radical. These quaternary salts are colored and may also be called dyes.

To effect quaternarization, it is merely necessary to bring the merocyanine dye and alkyl salt into contact with one another, ordinarily accelerating the quaternarization with heat. It is frequently advantageous to effect the quaternarization in the presence of a diluent. Inasmuch as it is ordinarily advantageous to heat the merocyanine dye and ester together at temperatures as high as 100° to 175° C., a high boiling liquid which is inert toward the dye and ester is advantageously employed as diluent. Nitrobenzene is well suited for this purpose. Quaternarization is especially readily effected with such alkyl salts as alkyl iodides, dialkyl sulfates and alkyl-p-toluenesulfonates. The latter two kinds of esters give quaternary salts of greater solubility than those obtained with alkyl iodides. The quaternary salts are generally more soluble (e. g. in water and in methyl alcohol) than the merocyanine dyes from which they are obtained.

The following examples will serve to demonstrate the manner of quaternarizing merocyanine dyes. These examples are not intended to limit my invention.

*Example 1.*—*5 - (3-ethyl - 2(3) - benzoxazolylidene) -2-methyl-mercapto - 4 - thiazolone ethiodide*

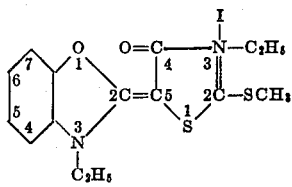

14.3 g. (1 mol.) of 3-ethyl-5-(3-ethyl-2(3)-benzoxazolylidene)-rhodanine and 9.1 g. (1.2 mol.) of methyl-p-toluenesulfonate were mixed together in 50 cc. of nitrobenzene. The mixture was heated at 135° to 140° C. for about 1½ hours. The orange solution was then cooled and diluted with 100 cc. of acetone. Then, to the acetone mixture, was added a solution of potassium iodide (15 g. dissolved in 20 cc. of water). A solid separated at once. However, before filtering off the solid, the mixture was chilled to 0° C. The yellow solid was then filtered off, washed on the filter with acetone, then with water and finally dried in the air. 14.1 g. (67.5% yield) of material was obtained. It was recrystallized from methyl alcohol (33 cc. per gram of solid) and was obtained as brown flakes having a metallic reflex and melting, with decomposition, at 172° to 173° C. (40% yield). It had practically no sensitizing action on photographic silver halide emulsions.

*Example 2.*—*5-(1-ethyl-2(1)-quinolylidene)-2-methylmercapto-4-thiazolone methoperchlorate*

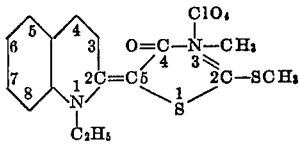

10.4 g. (1 mol.) of 3-ethyl-5-(1-ethyl-2(1)-quinolylidene)-rhodanine and 18.8 g. (4 mol.) of methyl iodide were mixed together and heated in a sealed glass tube at 100° C. for 48 hours. The cooled reaction mixture (a dark viscous mass) was stirred with acetone until crystalline. It was filtered from the acetone, washed on the filter with acetone and dried in the air. 12.5 g. (90% yield) of brownish-red crystals were obtained. 1.0 g. of these crystals were dissolved in 25 cc. of methyl alcohol and the methyl alcoholic solution treated with a methyl alcoholic solution of sodium perchlorate (in excess), precipitating the quaternary salt substance as the perchlorate. The perchlorate was recrystallized from methyl alcohol (60 cc. per gram of perchlorate) and obtained as buff needles, melting, with decomposition, at 199° to 201° C. The substance had practically no sensitizing action on photographic silver halide emulsions.

*Example 3.* — *5 - (3 - ethyl-2(3)-benzothiazolylidene)-2-methyl-mercapto-4-thiazolone ethiodide*

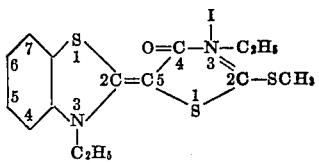

20.2 g. (1 mol.) of 3-ethyl-5-(3-ethyl-2(3)-benzothiazolylidene)-rhodanine and 12.8 g. (1.1 mol.) of methyl-p-toluene-sulfonate were mixed together in 100 cc. of nitrobenzene. The mixture was heated at 120° to 125° C. for 2 hours. The resulting orange solution was cooled and then diluted with 500 cc. of acetone. To the diluted solution was then added a solution of potassium iodide (20.8 g. dissolved in 30 cc. of water). A solid separated at once. It was filtered off, washed on the filter with acetone, and then with water and then dried in the air. 22.9 g. (79% yield) of a yellow material were obtained. It was recrystallized from methyl alcohol (160 cc. per gram of material) and obtained as yellow needles, melting at 239° to 240° C., with decomposition (yield 55%). It had a slight sensitizing action on a photographic gelatino-silver-chloride emulsion.

*Example 4.* — *5 - (3 - ethyl-2(3) -benzothiazolylidene)-2-methyl-mercapto-1-phenyl-4-imidazolone phenoperchlorate*

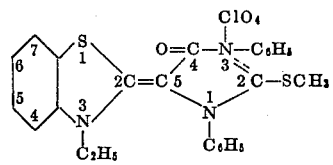

12.5 g. (1 mol.) of 5-(3-ethyl-2(3)-benzothiazolylidene)-1,3-diphenyl-2-thiohydantoin and 12 g. (3 mol.) of methyl iodide were mixed together and heated in a sealed glass tube at 110° for 48 hours. The cooled reaction mixture (a brown viscous liquid) was stirred with acetone until it became crystalline. The crystalline material was then filtered off, washed on the filter with acetone and finally dried in the air. 9.9 g. (60% yield) of material was obtained. 1.0 g. was dissolved in 25 cc. of methyl alcohol and the methyl alcoholic solution was treated with a methyl alcoholic solution of sodium perchlorate (in excess), precipitating the quaternary salt as the perchlorate. It was recrystallized from methyl alcohol (50 cc. per gram of perchlorate) and obtained as yellow crystals, melting, with decomposition, at 246° to 248° C. It had practically no sensitizing action on photographic silver halide emulsions.

*Example 5.*—*5-(3-ethyl-2(3)-β-naphthoxazolylidene)-2-methyl-mercapto-4-thiazolone ethiodide*

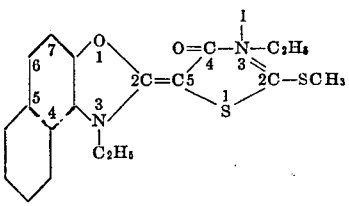

6.8 g. (1 mol.) of 3-ethyl-5-(3-ethyl-2(3)-β-naphthoxazolylidene)-rhodanine and 3.6 g. (1 mol.) of methyl-p-toluene-sulfonate were mixed together in 15 cc. of nitrobenzene. The mixture was heated at 140° C. for about 1½ hours. The resulting orange solution was cooled and diluted with 100 cc. of acetone. To the diluted solution was added an aqueous solution of potassium iodide (6.4 g. dissolved in 10 cc. of water). A yellow solid separated and was filtered off after chilling the mixture to 0° C. The solid was washed on the filter with acetone and then with water and finally dried in the air. 5.6 g. (59% yield) of material were obtained. It was recrystallized from methyl alcohol (33 cc. per gram of material) and obtained as light brown crystals, melting, with decomposition, at 216° to 219° C. It sensitized a photographic gelatino-silver-chloride emulsion out to about 520 mu with a maximum at about 465 mu.

*Example 6.—5 - [(3 - ethyl - 2(3) - benzoxazolylidene)-ethylidene]-2-methylmercapto - 4 - thiazolone pheniodide*

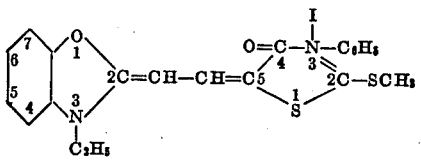

19 g. (1 mol.) of 5-[(3-ethyl-2(3)-benzoxazolylidene)-ethylidene]-3-phenylrhodanine and 28.4 g. (2 mol.) of methyl iodide were mixed together and heated in a sealed glass tube at 100° C. for 40 hours. The resulting solid red cake was cooled and crushed under acetone, filtered from the acetone, washed on the filter with acetone and finally dried in the air. 25.2 g. (96.5% yield) of material was obtained. It was recrystallized from methyl alcohol (100 cc. per gram of material) and a 63% yield of purified quaternary salt substance was obtained as red crystals, melting, with decomposition, at 254° to 256° C. The substance had practically no sensitizing action on a gelatino-silver bromide emulsion.

*Example 7.—5 - [(3 - ethyl - 2(3) - benzoxazolylidene) - ethylidene] - 2 - methylmercapto - 1-phenyl-4-imidazolone pheniodide*

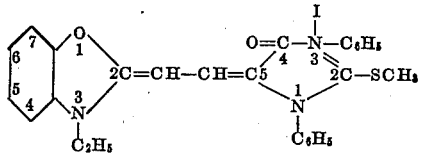

11.8 g. (1 mol.) of 5-[(3-ethyl-2(3)-benzoxazolylidene) ethylidene]-1,3-diphenyl-2 - thiohydantoin and 7.6 g. (2 mol.) of methyl iodide were mixed together and heated in a sealed glass tube at 100° C. for 40 hours. The resulting red solid cake was cooled and crushed under acetone. The acetone mixture was chilled to 0° C. and the red solid was filtered off, washed on the filter with acetone and finally dried in the air. 6.7 g. (42.5% yield) of material was obtained. It was recrystallized from methyl alcohol (10 cc. per gram of material) and obtained, in 30% yield, as orange crystals, melting, with decomposition, at 155° to 160° C. It sensitized a photographic gelatino-silver-bromide emulsion out to about 540 mu with a maximum at about 520 mu.

*Example 8.—5-[(3-β-carbethoxyethyl - 2(3)-benzothiazolylidene) ethylidene]-2-ethylmercapto-4-thiazolone carbethoxymethoperchlorate*

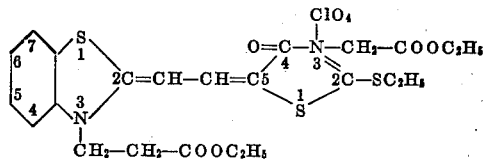

4.7 g. (1 mol.) of 5-[(3-β-carbethoxyethyl-2(3)-benzothiazolylidene) ethylidene] - 3 - carbethoxymethylrhodanine and 3.0 g. (2 mol.) of diethylsulfate were mixed together and heated at 130° C. for 2 hours. The viscous red liquid was cooled and stirred with 100 cc. of diethyl ether. The ethereal layer was decanted and the residue was dissolved in 15 cc. of methyl alcohol. The methyl alcoholic solution was treated with a methyl alcoholic solution of sodium perchlorate (in excess) to precipitate the quaternary salt substance as the perchlorate. The perchlorate was filtered off and dried in the air. 3.6 g. (60% yield) of quaternary perchlorate was obtained. It was recrystallized from methyl alcohol (80 cc. per gram of perchlorate) and a 14% yield of dark green crystals, melting, with decomposition, at 115° to 117° C. was obtained.

*Example 9.—5-[(3-ethyl- 2(3) - benzothiazolylidene) ethylidene]-2 - methylmercapto-4-thiazolone methoperchlorate*

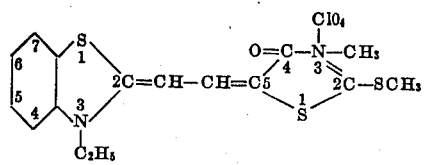

11.6 g. (1 mol.) of 5-[(3-ethyl-2(3)-benzothiazolylidene) ethylidene]-3-methylrhodanine and 15 g. (3 mol.) of methyl iodide were mixed together and heated in a sealed glass tube at 100° C. for 24 hours. The resulting green solid cake was cooled and crushed under acetone, filtered from the acetone, washed on the filter with acetone and finally dried in the air. 16.2 g. (98% yield) of material was obtained. About 1.0 g. of it was dissolved in 25 cc. of methyl alcohol and the methyl alcoholic solution was treated with an excess of sodium perchlorate (dissolved in methyl alcohol) to precipitate the quaternary salt as the perchlorate. The perchlorate was recrystallized from nitromethane (100 cc. per gram of perchlorate) and obtained as violet crystals melting at 272° to 273° C., with decomposition. These crystals sensitized a gelatino-silver - bromide emulsion out to about 620 mu with a maximum at about 500 mu.

*Example 10.—5 - [ (3-ethyl-2(3)-β-naphthothiazolylidene) ethylidene]-2-methylmercapto - 4 - thiazolone ethoperchlorate*

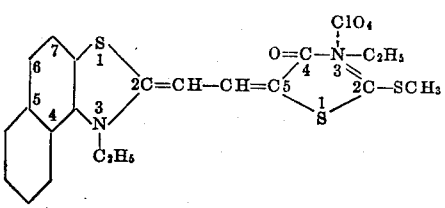

13.5 g. (1 mol.) of 3-ethyl-5-[(3-ethyl-2(3)-β-naphthothiazolylidene) ethylidene] - rhodanine and 14.5 g. (3 mol.) of methyl iodide were mixed and heated together in a sealed glass tube at 110° C. for 48 hours. The solid mass resulting was cooled and crushed under acetone, filtered from the acetone, washed on the filter with acetone and finally dried in the air. 17.6 g. (96% yield) of material were obtained. About 1.0 g. of the material was dissolved in 25 cc. of methyl alcohol and the methyl alcoholic solution treated with an excess of sodium perchlorate (dissolved in methyl alcohol) to precipitate the material as the quaternary perchlorate. The quaternary perchlorate was filtered off and recrystallized from nitromethane (25 cc. per gram of material) and obtained as minute green crystals melting, with decomposition, at 215° to 216° C.

*Example 11.*—*5[(1-ethyl - 2 ( 1 ) - quinolylidene) ethylidene] - 2 - methylmercapto-4-thiazolone ethoperchlorate*

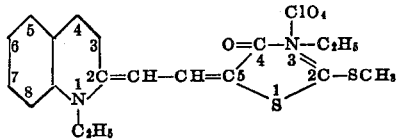

12.7 g. (1 mol.) of 3-ethyl-5-[(1-ethyl-2(1)-quinolylidene) ethylidene]-rhodanine and 16 g. (3 mol.) of methyl iodide were mixed together and heated in a sealed glass tube at 110° C. for 48 hours. The resulting crystalline mass was cooled and crushed under acetone, filtered from the acetone, washed on the filter with acetone and finally dried in the air. 16.2 g. (91% yield) of material were obtained. About 1.0 g. of the material was dissolved in 25 cc. of methyl alcohol and the methyl alcoholic solution treated with an excess of sodium perchlorate (dissolved in methyl alcohol) to precipitate the quaternary salt substance as the perchlorate. It was recrystallized from acetic acid (155 cc. per gram of material) and obtained as purple crystals, melting, with decomposition, at 277° to 278° C.

*Example 12.*—*5-[(3-ethyl- 2 ( 3 ) -benzoxazolylidene) ethylidene]-2-ethylmercapto- 4 -thiazolone etho-p-toluene-sulfonate*

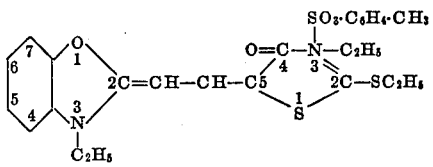

8.3 g. (1 mol.) of 3-ethyl-5-[(3-ethyl-2(3)-benzoxazolylidene) ethylidene]-rhodanine and 7.5 g. (1.5 mol.) of ethyl-p-toluene sulfonate were mixed together in 25 cc. of nitrobenzene. The mixture was heated in an oil bath at 165° to 170 C. for 3 hours. The resulting dark red liquid was cooled and diluted with 300 cc. of acetone. The acetone mixture was chilled at 0 C. for a few hours. The red solid which separated was filtered from the acetone, washed on the filter with acetone and finally dried in the air. 3.8 g. (29% yield) of material was obtained. It was recrystallized from acetone (2000 cc. per gram of material) and obtained as red crystals, melting, with decomposition, at 204° to 206 C.

*Example 13.*—*5-[(3-ethyl-2(3)-benzoselenazolylidene) ethylidene] - 2 - methylmercapto-4(5)-thiazolone ethiodide*

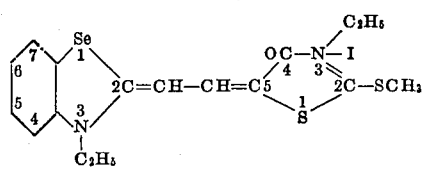

5.2 g. (1 mol.) of 3-ethyl-5-[(3-ethyl-2(3)-benzoselenazolylidene) ethylidene] - rhodanine and 5.6 g. (1 mol.+200% excess) of methyl iodide were mixed together and heated in a sealed glass tube at 100 C. for 48 hours. The resulting dark viscous mass was cooled and stirred with 200 cc. of acetone until crystals formed. The acetone mixture was chilled to 0° C. and filtered. The crystals were washed on the filter with acetone and finally dried in the air. 6.5 g. (93% yield) of green crystals, melting, with decomposition, at 237° to 240° C. were obtained. The crystals desensitized a photographic gelatino-silver-bromide emulsion.

*Example 14.*—*5-[(1 - ethyl - 4(1) - quinolylidene) ethylidene] - 2 - methylmercapto - 4(5) - thiazolone ethiodide*

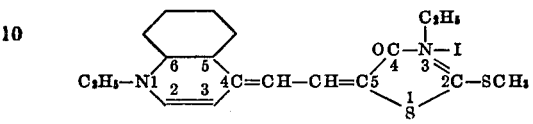

2.2 g. (1 mol.) of 3-ethyl-5-[(1-ethyl-4(1)-quinolylidene) ethylidene]-rhodanine and 3.0 g. (1 mol.+200%) methyl iodide were mixed together and heated in a sealed glass tube at 100° C. for 24 hours. The resulting green crystalline mass was crushed under acetone, filtered from the acetone, washed with acetone and dried in the air. 2.5 g. (66% yield) of green crystals having a bright reflex and melting, with decomposition, at 207° to 209° C. were obtained. They had no sensitizing action on a photographic emulsion.

*Example 15.*—*5-[(5-chloro-3-ethyl-2(3)-benzothiazolylidene) isopropylidene]-2-methylmercapto-4(5)-thiazolone ethiodide*

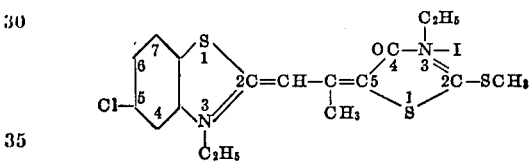

8.0 g. (1 mol.) of 5-[(5-chloro-3-ethyl-2(3)-benzothiazolylidene) isopropylidene]-3-ethylrhodanine and 8.6 g. (1 mol.+200% excess) of methyl iodide were heated together in a sealed glass tube at 100° C. for 24 hours. The resulting red crystalline mass was cooled and crushed under acetone, filtered, washed with acetone and dried in the air. 10.6 g. (98%) of bright green crystals, melting, with decomposition, at 256° to 257° C. were obtained. They had no sensitizing action on a photographic emulsion.

As shown in the foregoing examples, it is advantageous to employ an excess of the alkyl salt (particularly when using alkyl iodides), of from 1.5 to 3 molecular proportions of alkyl salt per molecular proportion of merocyanine dye being suitable concentrations.

These quaternary salt substances are not very stable, and, in most cases, slowly decompose upon standing. The perchlorates are ordinarily the most stable form. The quaternary salt substances represented by Formula II, where $n$ represents two, are especially unstable and should be used as quickly after preparation as possible. Of these quaternary salts, those where Z (in Formula II) represents the non-metallic atoms necessary to complete a quinoline nucleus, when $d$ represents two, and where Z represents the non-metallic atoms necessary to complete a quinoline, a thiazole, a selenazole or an oxazole nucleus, when $d$ represents one, are especially useful intermediates for the preparation of more complex dyes.

I have found that my new quaternary salt intermediates (Formula II above) can be condensed with cyclammonium quaternary salts containing, in the alpha or gamma position, i. e. in one of the so-called reactive positions, an alkyl group of the formula R—CH₂—, wherein R represents hydrogen or an alkyl group, to give new dyes which can be represented by the following general formula:

III.

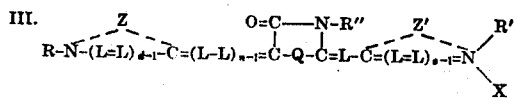

wherein $d$ and $e$ each represent a positive integer of from one to two, $n$ represents a positive integer of from one to three, L represents a methine group, Q represents oxygen, sulfur, an alkylimino group or an arylimino group, R and R' each represent alkyl groups, R'' represents an alkyl or an aryl group, X represents an acid radical and Z and Z' each represent the non-metallic atoms necessary to complete a heterocyclic organic nucleus.

More particularly, in Formula III, R and R' represent alkyl groups, such as methyl, ethyl, butyl, allyl, benzyl, or β-ethoxyethyl for example, R'' represents an alkyl group, such as the foregoing for example, or an aryl group, such as phenyl, p-chlorophenyl or naphthyl for example, X represents an acid radical, such as halide, perchlorate, alkylsulfate or p-toluenesulfonate for example, and Z and Z', when $d$ and $e$ represent two, each represent the non-metallic atoms necessary to complete a pyridine or a quinoline nucleus for example and when $d$ and $e$ represent one, the non-metallic atoms necessary to complete an oxazole, a thiazole, a selenazole, a thiazoline, a pyridine or a quinoline nucleus for example.

In preparing my new dyes represented by Formula III, I have found it advantageous to effect the condensations in the presence of an acid-binding agent. Pyridine, N-methylpiperidine, triethylamine and triethanolamine are especially suitable acid-binding agents. Sodium carbonate or other salts of strong bases and weak acids can be used. Except when using pyridine, it is advantageous to effect the condensations in the presence of a diluent. Methyl, ethyl or isopropyl alcohols are suitable diluents. Heat accelerates the formation of my new dyes. These new dyes, in addition to sensitizing photographic emulsions, are useful as the absorbing means in the construction of light filters.

The following examples will serve to demonstrate the manner of obtaining my new dyes, represented by Formula III above. These examples are not intended to limit my invention:

*Example 16.* — 5-(3-ethyl-2(3)-benzothiazolylidene)-3-ethyl-2-[(2-β-naphthoxazolyl-ethiodide) methylene]-4-thiazolidone.

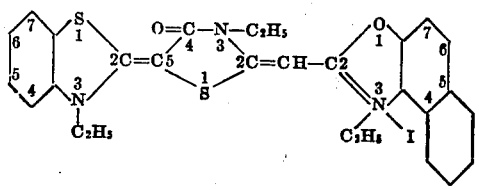

1.16 g. (1 mol.) of 5-(3-ethyl-2(3)-benzothiazolylidene)-2-methylmercapto-4-thiazolone ethiodide, 0.85 g. (1 mol.) of 2-methyl-β-naphthoxazole ethiodide and 0.25 g. (1 mol.) of triethylamine were mixed together in 10 cc. of absolute ethyl alcohol. The mixture was boiled, under reflux, for 5 minutes. The orange dye separated at once. The reaction mixture was chilled to 0° C., the dye filtered off, washed on the filter with acetone, then with water and finally dried in the air. The dye was contaminated with 3-ethyl-5-(3-ethyl-2 (3)-benzothiazolylidene) rhodanine formed by decomposition of the quaternary salt intermediate. The dye was freed from this contaminating product by recrystallization from methyl alcohol (330 cc. per gram of dye) and obtained, in 19% yield, as orange crystals, melting, with decomposition, at 274° to 276° C. This dye sensitized a photographic gelatino-silver-bromiodide emulsion out to about 555 mu with a maximum at 500 mu.

A dye was prepared in the same manner using 2-methyl-α-naphthoxazole ethiodide instead of the beta salt. After recrystallization from methyl alcohol (800 cc. per gram of dye), it was obtained, in 32% yield, as minute red crystals, melting, with decomposition, at 291° to 293° C. This dye sensitized a photographic gelatino-silver-bromiodide emulsion out to about 565 mu with a flat maximum at about 500 mu.

*Example 17.* — 2-[(2-benzothiazolyl-ethiodide) methylene]-3-ethyl-5-(3-ethyl-2(3)-benzothiazolylidene)-4-thiazolidone

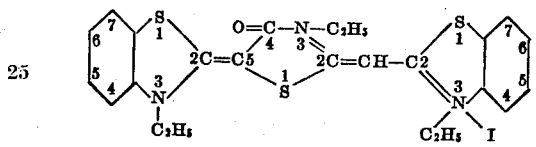

1.16 g. (1 mol.) of 5-(3-ethyl-2(3)-benzothiazolylidene-2-methylmercapto-4-thiazolone ethiodide, 0.75 g. (1 mol.) of 2-methylbenzothiazole ethiodide were mixed together in 10 cc. of pyridine. The mixture was boiled, under reflux, for about one minute. Orange dye separated at once. The reaction mixture was chilled to 0° C., the dye filtered off, washed on the filter with acetone, then with water and finally dried in the air. The dye was recrystallized from pyridine (115 cc. per gram of dye) and obtained, in 47% yield, as orange crystals, melting at 274° to 276° C., with decomposition. It sensitized a photographic gelatino-silver-bromiodide emulsion out to 560 mu with a maximum at 530 mu.

A dye was prepared in the same manner, using 2-methyl-β-naphthothiazole ethiodide instead of the benzothiazole salt. After recrystallization from pyridine (800 cc. per gram of dye), it was obtained, in 6.2% yield, as red crystals, melting, with decomposition, at 273° to 274° C. It sensitized a gelatino-silver-bromiodide emulsion out to 565 mu with a maximum at 535 mu.

*Example 18.* — 2-[(2-benzothiazolyl-ethiodide) methylene]-3-ethyl-5-(1-ethyl-2(1)-quinolylidene-4-thiazolidone.

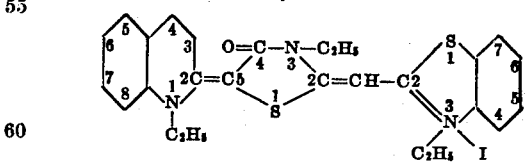

1.15 g. (1 mol.) of 5-(1-ethyl-2(1)-quinolylidene)-2-methylmercapto-4-thiazolone ethiodide, 0.75 g. (1 mol.) of 2-methylbenzothiazole ethiodide and 0.25 g. of triethylamine were mixed together in 10 cc. of absolute ethyl alcohol. The mixture was boiled, under reflux, for about 5 minutes. Red dye separated at once. The reaction mixture was chilled, the dye filtered off, washed on the filter with acetone, then with water and finally dried in the air. 1.05 g. (72% yield) of dye were obtained. It was recrystallized from methyl alcohol and obtained, in 61% yield, as bright green plates, having a metallic reflex and melting, with decomposition, at 256° to 257° C. It sensitized a gelatino-silver-bromiodide emulsion to about 630 mu with a maximum at 500 mu.

A dye was prepared in the same manner, using quinaldine ethiodide instead of 2-methylbenzothiazole ethiodide. After recrystallization from methyl alcohol (165 cc. per gram of dye), it was obtained, in 42% yield, as green crystals, melting, with decomposition, at 256° to 258° C. It sensitized a gelatino-silver-bromiodide emulsion weakly out to 640 mu.

A dye was prepared in the same manner, using lepidine ethiodide instead of 2-methylbenzothiazole ethiodide. After recrystallization from methyl alcohol (200 cc. per gram of dye), it was obtained, in 42% yield, as minute green needles, having a golden reflex and melting, with decomposition, at 265° to 266° C. It sensitized a gelatino-silver-bromiodide emulsion weakly out to about 680 mu.

Example 19.—2 - [(2 - benzothiazolyl-ethiodide)-methylene]-5 -(3- ethyl - 2(3) - benzothiazolylidene)-1,3-diphenyl-4-imidazolidone

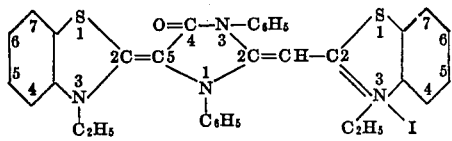

1.43 g. (1 mol.) of 5-(3-ethyl-2(3)-benzothiazolylidene) - 2-methylmercapto-1-phenyl-4-imidazolone pheniodide, 0.75 g. (1 mol.) of 2-methylbenzothiazole ethiodide and 0.25 g. (1 mol.) of triethylamine were mixed together in 10 cc. of absolute ethyl alcohol. The mixture was boiled, under reflux, for 5 minutes. A red-orange coloration developed. The reaction mixture was chilled to 0° C. and mixed with 200 cc. of diethyl ether. The ethereal layer was decanted and the residue was stirred with acetone until it became crystalline. The crystalline dye was filtered off, washed on the filter with acetone and dried in the air. 1.0 g. (57% yield) of dye was obtained. It was recrystallized from methyl alcohol (40 cc. per gram of dye) and obtained, in 29% yield, as minute red crystals, melting, with decomposition, at 209° to 211° C. It sensitized a gelatino-silver-bromiodide emulsion to 550 mu with a flat maximum at 500 to 520 mu.

Example 20.—2-[(2 - benzothiazolyl - ethiodide)-methylene]-3-ethyl - 5-[(3-ethyl-2(3)-benzoxazolylidene) ethylidene]-4-thiazolidone

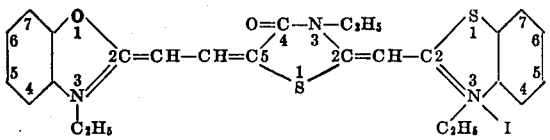

1.3 g. (1 mol.) of 5-[(3-ethyl-2(3)-benzoxazolylidene) ethylidene]-2-methylmercapto - 4-thiazolone etho-p-toluenesulfonate and 0.75 g. (1 mol.) of 2-methylbenzothiazole ethiodide were mixed together in 10 cc. of pyridine. The mixture was boiled, under reflux, for one minute. A bluish-red coloration developed. The reaction mixture was chilled to 0° C., the dye which separated filtered off, washed with water, then with acetone and finally dried. 1.1 g. (73% yield) of a dark blue solid were obtained. It was recrystallized from methyl alcohol (500 cc. per gram of dye) and obtained, in 40% yield, as minute green crystals having a green reflex and melting, with decomposition, at 282° to 283° C. It sensitized a gelatino-silver-bromiodide emulsion out to 680 mu, with maxima at 540 mu and at 600 mu.

A dye was prepared in the same manner, using 2-methyl-β-naphthothiazole ethiodide instead of the benzothiazole salt. After recrystallization from methyl alcohol (1400 cc. per gram of dye), it was obtained, in 52% yield, as minute green crystals having a golden reflex and melting, with decomposition, at 253° to 254° C. It sensitizes a gelatino-silver-bromiodide emulsion to 680 mu, with maxima at 545 mu and at 610 mu.

A dye was prepared in the same manner, using quinaldine ethiodide instead of 2-methylbenzothiazole ethiodide. After recrystallization from methyl alcohol (130 cc. per gram of dye), the dye was obtained as minute dark blue crystals, having a golden reflex and melting, with decomposition at 272° to 273° C. It had no sensitizing action on silver halide emulsions.

Example 21.—2 - [(2 - benzoxazolyl - ethiodide) methylene]-3-ethyl-5 - [(3-ethyl-2(3)-benzoxazolylidene) ethylidene]-4-thiazolidone

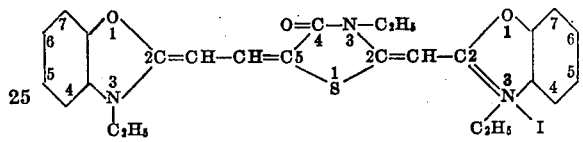

1.2 g. (1 mol.) of 5-[(3-ethyl-2(3)-benzoxazolylidene) ethylidene]-2-methylmercapto - 4 - thiazolone ethiodide, 1.45 g. (2 mol.) of 2-methylbenzoxazole ethiodide and 0.25 g. (1 mol.) of triethylamine were mixed together in 15 cc. of absolute ethyl alcohol. The mixture was boiled, under reflux, for 5 minutes. A purple coloration developed and dye separated. The reaction mixture was chilled to 0° C., the dye filtered off, washed with acetone, then with water and finally dried in the air. 1.3 g. (88.5% yield) of dye were obtained. It was recrystallized from methyl alcohol (190 cc. per gram of dye) and obtained, in 71.5% yield, as minute green crystals having a green reflex and melting, with decomposition, at 283° to 285° C. It sensitized a gelatino-silver-bromiodide emulsion strongly out to 660 mu, with a fairly flat maximum extending from 520 mu to 610 mu.

A dye was prepared in the same manner, using 2-methyl-α-naphthoxazole ethiodide instead of 2-methylbenzoxazole ethiodide. After recrystallization from methyl alcohol (670 cc. per gram of dye), the dye was obtained as minute green crystals, having a golden reflex and melting, with decomposition, at 290° to 292° C. It sensitized a gelatino-silver-bromiodide emulsion out to 660 mu with a maximum at 580 mu.

A dye prepared in the same manner, using 2-methyl-β-naphthoxazole ethiodide, was obtained after recrystallization from methyl alcohol (365 cc. per gram of dye) as minute green crystals, having a golden reflex and melting, with decomposition, at 255° to 257° C. It sensitized a gelatino-silver-bromiodide emulsion out to 660 mu, with a fairly flat maximum extending from 500 mu to 600 mu.

A dye prepared in the same manner, using lepidine ethiodide, was obtained after recrystallization from methyl alcohol (270 cc. per gram of dye) as dark green needles, melting, with decomposition, at 293° to 295° C. The dye had no sensitizing action.

A dye prepared in the same manner, using 2-methylbenzo-selenazole etho-p-toluenesulfonate and converting the dye to the iodide with potassium iodide, was obtained after recrystallization from methyl alcohol (330 cc. per gram of dye) as dark green needles with a green reflex and a melting point of 275° to 276° C., with decomposition. The dye sensitized a gelatino-silver-bromiodide emulsion moderately out to 680 mu.

A dye prepared in the same manner, using 2-methyl-α-naphthothiazole etho-p-toluenesulfonate, was obtained after recrystallization from methyl alcohol (19 cc. per gram of dye) as green crystals, having a golden reflex, and melting, with decomposition, at 274° to 275° C. It sensitized a gelatino-silver-bromiodide emulsion to 660 mu with a maximum at 610 mu.

A dye prepared in the same manner, using 2-methylbenzothiazole-β-ethoxyethiodide, was obtained, after recrystallization from methyl alcohol (90 cc. per gram of dye) as minute green needles, having a metallic reflex, and melting, with decomposition, at 277° to 278° C. It sensitized a gelatino-silver-bromiodide emulsion out to 690 mu, with a fairly flat maximum extending from 520 mu to 560 mu.

A dye prepared in the same manner, using 2-methylbenzothiazole benziodide, was obtained, after recrystallization from methyl alcohol (700 cc. per gram of dye) as felted green crystals, having a golden reflex and melting, with decomposition, at 272° to 274° C. It sensitized a gelatino-silver-bromiodide emulsion out to 680 mu, with a flat maximum extending from 530 mu to 600 mu.

A dye prepared in the same manner, using 2-methylbenzothiazole-β-hydroxyethiodide, was obtained, after recrystallization from methyl alcohol (925 cc. per gram of dye) as felted dark green crystals, melting, with decomposition, at 305° to 307° C. It sensitized a gelatino-silver-bromiodide emulsion out to 690 mu, with a maximum at 540 mu.

*Example 22.*—*3-ethyl-5-[(3-ethyl-2(3)-benzoxazolylidene) ethylidene] - 2 - [2 - (4 - phenylthiazolyl-ethoperchlorate)-methylene]-4-thiazolidone*

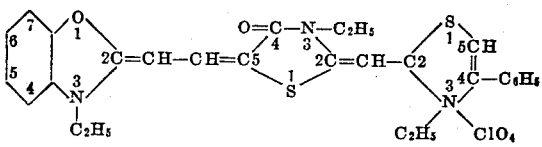

1.8 g. (1 mol.) of 2-methyl-4-phenylthiazole etho-p-toluenesulfonate and 2.6 g. (1 mol.) of 5-[(3-ethyl-2(3)-benzoxazolylidene) ethylidene]-2-methylmercapto-4-thiazolone etho-p-toluenesulfonate and 0.5 g. (1 mol.) of triethylamine were mixed together in 15 cc. of absolute ethyl alcohol. The mixture was boiled, under reflux, for 3 minutes. The reaction mixture was cooled, mixed with 100 cc. of diethyl ether, the ethereal layer decanted, and the residue dissolved in 25 cc. of methyl alcohol. The hot methyl alcoholic solution was treated with an excess of sodium perchlorate (in solution in hot methyl alcohol) to precipitate the dye as the perchlorate. The dye was filtered off, washed with acetone, then with water and finally dried in the air. 0.6 g. (20% yield) of dye were obtained. The dye was recrystallized from methyl alcohol (1400 cc. per gram of dye) and obtained, in 15% yield, as green needles, having a green reflex, and melting, with decomposition, at 261° to 263° C. The dye sensitized a gelatino-silver-bromiodide emulsion to 640 mu, with a fairly flat maximum extending from 520 mu to 590 mu.

A perchlorate dye was prepared in a similar manner, using 2,4-dimethylthiazole etho-p-toluenesulfonate instead of the 2-methyl-4-phenyl-thiazole salt. The dye was obtained, after recrystallization from methyl alcohol (2300 cc. per gram of dye), as minute red crystals, melting, with decomposition, at 291° to 292° C. It sensitized a gelatino-silver-bromide emulsion to 640 mu with a fairly flat maximum extending from 520 mu to 580 mu.

*Example 23.*—*2-[(2 - benzothiazolyl - ethiodide)-methylene]-3-ethyl -5- [(1-ethyl-2(1)-quinolylidene)-ethylidene]-4-thiazolidone*

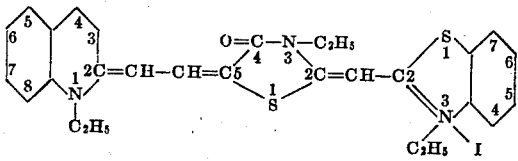

1.2 g. (1 mol.) of 5-[(1-ethyl-2(1)-quinolylidene) ethylidene]-2-methylmercapto-4-thiazolone ethiodide, 0.75 g. (1 mol.) of 2-methylbenzothiazole ethiodide and 0.25 g. (1 mol.) of triethylamine were mixed together in 15 cc. of absolute ethyl alcohol. The mixture was boiled, under reflux, for 5 minutes. Green dye separated at once. The reaction mixture was chilled to 0° C., the dye filtered off, washed on the filter with acetone and then with water and finally dried in the air. 1.5 g. (97% yield) of dye were obtained. The dye was extracted with 200 cc. of boiling pyridine to remove impurities and was obtained as minute green crystals, melting, with decomposition, at 286° to 288° C. It sensitized a photographic gelatino-silver-bromiodide emulsion out to 720 mu, with a maximum at 660 mu.

A dye prepared in the same manner, using 2-methylbenzoxazole ethiodide instead of 2-methlbenzothiazole ethiodide, was obtained, after extraction with 75 cc. of hot pyridine, as green crystals, melting, with decomposition, at 298° to 300° C. It sensitized a gelatino-silver-bromiodide emulsion to 740 mu with a maximum at 625 mu.

A dye prepared in the same manner, using 2-methyl-β-naphthothiazole ethiodide instead of 2-methylbenzothiazole ethiodide, was obtained, after extraction with 100 cc. of boiling pyridine, as green crystals, melting, with decomposition, at 246° to 248° C. It sensitized a gelatino-silver-bromiodide emulsion moderately to 740 mu.

*Example 24.*—*2-[(2-benzothiazolyl - ethiodide)-methylene] -3-ethyl-5-[(3-ethyl-2(3)-β-naphthothiazolylidene) ethylidene]-4-thiazolidone*

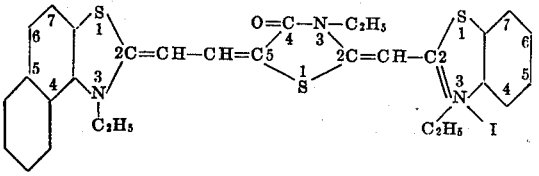

1.35 g. (1 mol.) of 5-[(3-ethyl-2(3)-β-naphthothiazolylidene) ethylidene]-2-methylmercapto-4-thiazolone ethiodide, 0.75 g. (1 mol.) of 2-methylbenzothiazole ethiodide and 0.25 g. (1 mol.) of triethylamine were mixed together in 15 cc. of absolute ethyl alcohol. The mixture was boiled, under reflux, for 5 minutes. A green dye separated at once. The reaction mixture was chilled to 0° C., washed on the filter with acetone, then with water and finally dried in the air. 1.5 g. (90% yield) of dye were obtained. The dye was extracted with 200 cc. of boiling pyridine to remove impurities and was obtained as green crystals, melting, with decomposition, at 267° to 268° C. It sensitized a gelatino-silver-bromiodide emulsion to 720 mu, with a flat maximum extending from 535 mu to 660 mu.

A dye prepared in the same manner, using 2-methyl-β-naphthothiazole ethiodide instead of 2-methylbenzothiazole ethiodide, was obtained as green crystals, melting, with decomposition, at 247° to 249° C. It sensitized a gelatino-silver-bromiodide emulsion to 720 mu.

*Example 25.—3-ethyl-5-[4-(3-ethyl-2(3)-benzoxazolylidene)-Δ²-butenylidene]-2-[2- (benzothiazolyl-ethiodide) - methylene] -4 - thiazolidone*

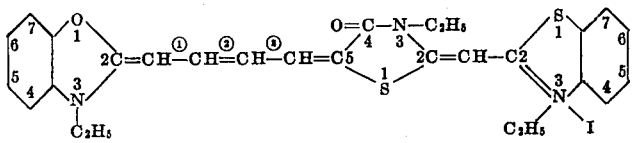

1.2 g. (1 mol.) of 3-ethyl-5-[(3-ethyl-2(3)-benzoxazolylidene) butenylidene] rhodanine and 0.8 g. (1 mol.) of diethylsulfate were mixed together in a small glass flask. The flask was heated strongly in a bare flame for ½ minute. The reaction mixture was cooled quickly and 1.5 g. (1 mol.) of 2-methylbenzothiazole ethiodide and 15 cc. of pyridine were mixed therewith. The mixture was boiled, under reflux, one minute. Dye separated at once. The reaction mixture was cooled, the dye filtered off, washed with methyl alcohol and dried. 0.4 g. (19% yield) of dye were obtained. The dye was extracted with 50 cc. of boiling pyridine to remove impurities and was obtained as minute green crystals, melting, with decomposition, at 287° to 288° C. It sensitized a photographic gelatino-silver-bromiodide emulsion moderately to about 760 mu with a maximum at 690 mu.

Still further examples of the preparation of my new dyes represented by Formula III above could be given, but the foregoing are believed to demonstrate the manner of practicing my invention.

I have found that my new quaternary salt intermediates (Formula II) can be condensed with quinaldine and lepidine to give dye bases. The condensations are advantageously effected in the presence of an acid-binding agent. The new dye bases have a slight sensitizing action on photographic silver halide emulsions. The following example will serve to demonstrate the formation of these dye bases.

*Example 26.—3-ethyl-5- [(3-ethyl-2(3) - benzoxazolylidene) ethylidene ] - 2-[ (2 - quinolyl) methylene]-4-thiazolidone*

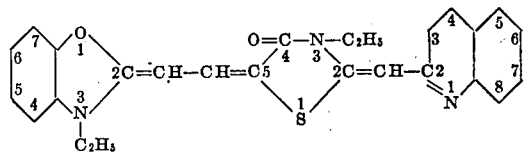

2.6 g. (1 mol.) of 5-[(3-ethyl-2(3)-benzoxazolylidene)ethylidene]-2-methylmercapto-4-thiazolone etho-p-toluenesulfonate and 1.4 g. (2 mol.) of quinaldine were mixed together in a small glass flask. The flask was heated strongly with a bare flame for about one minute. The reaction mixture was cooled, stirred with 10 cc. of acetone. The solid material was filtered from the acetone, washed with acetone and sucked dry. The solid material was mixed with 25 cc. of hot methyl alcohol and the mixture made alkaline with triethylamine. The blue color was discharged and a red solid separated. The mixture was chilled to 0° C., the red solid filtered off, washed with methyl alcohol and dried. 1.05 g. (48% yield) of dye base was obtained. It was recrystallized from methyl alcohol (1250 cc. per gram of dye) and obtained as red crystals having a green reflex, and melting, with decomposition, at 240° to 242° C.

The lepidine base obtained in the same manner, using lepidine instead of quinaldine, was obtained as red crystals, melting at 212° to 213° C., with decomposition.

These dye bases are useful as the absorbing means in the construction of light filters.

I have found that my new quaternary salt intermediates (Formula II) can be condensed with primary amines to give dyes and dye bases some of which sensitize photographic silver halide emulsions and all of which are useful as the light absorbing means in the construction of light filters. The following examples will serve to demonstrate the manner of preparing these new dyes.

*Example 27. — 2-[(2-benzothiazolyl-ethiodide)-imino]-3-ethyl-5-[(3-ethyl-2(3)-benzoxazolylidene)-ethylidene]-4-thiazolidone*

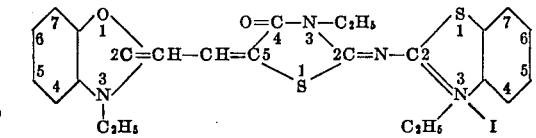

1.2 g. (1 mol.) of 5-[(3-ethyl-2(3)-benzoxazolylidene)ethylidene]-2-methylmercapto-4-thiazolone ethiodide, 0.8 g. (1 mol.) of 2-aminobenzothiazole ethiodide and 0.25 g. (1 mol.) of triethylamine were mixed together in 10 cc. of pyridine. The mixture was boiled, under reflux, for about 5 minutes. The reaction mixture was cooled and stirred with 100 cc. of diethyl ether. The ethereal layer was decanted and the residue was stirred with 10 cc. of acetone. The acetone mixture was chilled to 0° C., the dye filtered off, washed on the filter with acetone and water and finally dried in the air. 0.5 g. (33% yield) of dye was obtained. The dye was recrystallized from methyl alcohol (60 cc. per gram of dye) and obtained as dark red crystals, melting, with decomposition, at 174° to 176° C. The dye sensitized a gelatino-silver-bromiodide emulsion to 645 mu, with a maximum at 530 mu.

*Example 28.—3-ethyl-5-[(3-ethyl-2(3) - benzoxazolylidene) ethylidene]-2-[(2-α-naphthothiazolyl)-imino]-4-thiazolidone*

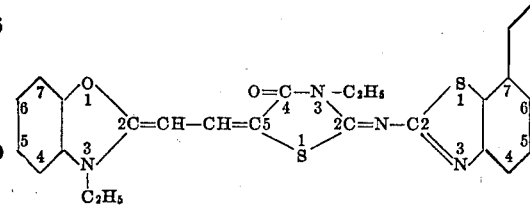

1.2 g. (1 mol.) of 5-[(3-ethyl-2(3)-benzoxazolylidene)ethylidene] - 2 - methylmercapto - 4 - thiazolone ethiodide, 0.5 g. (1 mol.) of 2-amino-α- naphthothiazole and 0.25 g. (1 mol.) of triethylamine were mixed together in 20 cc. of absolute ethyl alcohol. The mixture was boiled, under reflux, for 5 minutes. The reaction mixture was chilled to 0° C., the dye base filtered off, washed with methyl alcohol and dried in the air. 0.5 g. (40% yield) of dye base was obtained. It was recrystallized from pyridine (50 cc. per gram of dye base) and obtained as orange crystals, melting, with decomposition, at 255° to 256° C. It sensitized a gelatino-silver-bromiodide emulsion to 580 mu, with a flat maximum extending from 490 mu to 540 mu.

A dye base was prepared in the same manner, using α-naphthylamine instead of 2-amino-α-naphthothiazole. It was obtained, after recrystallization from methyl alcohol (750 cc. per gram of dye base), as yellow crystals, melting, with decomposition, at 227° to 288° C. It had no sensitizing action on gelatino-silver-halide emulsions.

A dye prepared using aniline, was obtained as yellow crystals, melting at 199° to 200° C., with decomposition. It had no sensitizing action on silver halide emulsions.

*Example 29.—Bis-2-{3-ethyl-5 - [(3-ethyl-2(3)-benzoxazolylidene) ethylidene] - 4-oxo-2-thiazolidylidene}-p-phenylenediamine*

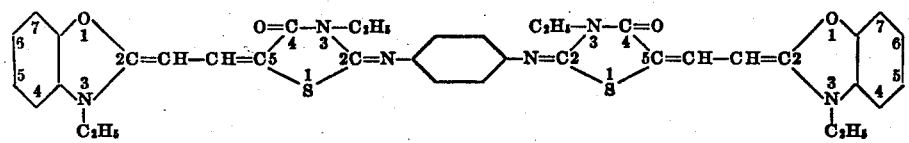

2.4 g. (2 mol.) of 5-[(3-ethyl-2(3)-benzoxazolylidene) ethylidene] - 2 - methylmercapto-4-thiazolone ethiodide, 0.27 g. (1 mol.) of p-phenylenediamine and 0.5 g. (2 mol.) of triethylamine were mixed together in 20 cc. of absolute ethyl alcohol. The mixture was boiled, under reflux, for about 5 minutes. Orange dye separated at once. The reaction mixture was chilled to 0° C., the dye filtered off, washed with methyl alcohol and finally dried in the air. 1.6 g. (91% yield) of dye were obtained. It was recrystallized from pyridine (560 cc. per gram of dye) and obtained as yellow crystals, melting above 340° C. It sensitized a gelatino-silver-bromiodide emulsion weakly out to 570 mu.

A bis dye was prepared in the same manner, using o- instead of p-phenylenediamine. After recrystallization from methyl alcohol (1150 cc. per gram of dye), it was obtained as orange crystals, melting at 307° to 309° C., with decomposition. It had no sensitizing action.

A bis dye was prepared in the same manner, using benzidine instead of p-phenylenediamine. After recrystallization from pyridine (130 cc. per gram of dye), it was obtained as orange crystals, melting above 340° C. It sensitized a gelatino-silver-bromiodide emulsion feebly out to 570 mu.

I have found that my new quaternary salt substances (Formula II above) can be condensed with organic compounds containing a ketomethylene (—CO—CH₂—) group, particularly heterocyclic organic compounds containing a ketomethylene group, to give new dyes which can be represented by the following general formula:

IV.
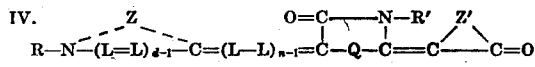

wherein $d$ represents a positive integer of from one to two, $n$ represents a positive integer of from one to three, L represents a methine group, Q represents oxygen, sulfur, an alkylimino group or an arylimino group, R represents an alkyl group, such as methyl, ethyl, butyl, allyl, benzyl or β-ethoxyethyl for example, R' represents an alkyl group (such as indicated for R for example) or an aryl group, such as phenyl, p-chlorophenyl or naphthyl for example, Z represents the non-metallic atoms necessary to complete a heterocyclic organic nucleus, such as (when $d$ equals one) an oxazole nucleus (e. g. 4-methyloxazole, 4-phenyloxazole, benzoxazole or naphthoxazole), a thiazole nucleus (e. g. 4-methylthiazole, 4-phenylthiazole, benzothiazole, or naphthothiazole), a selenazole nucleus (e. g. 4-methylselenazole, 4-phenylselenazole or benzoselenazole), a thiazoline nucleus, a quinoline nucleus or a pyridine nucleus, and such as (when $d$ equals two) a pyridine nucleus or a quinoline nucleus for example, and Z' represents the non-metallic atoms necessary to complete a heterocyclic organic nucleus, such as a rhodanine nucleus, a thionaphthenone nucleus, a 2-thio-2,4(3,5)-oxazoledione nucleus, a 2-thiohydantoin nucleus, a 5-thiopyrazolone nucleus, a thiobarbituric acid nucleus, a hydantoin nucleus or a thio-oxindole nucleus for example.

In preparing my new dyes represented by Formula IV, I have found it advantageous to effect the condensations in the presence of an acid-binding agent. The following examples will serve to demonstrate the manner of obtaining these new dyes which sensitize photographic silver halide emulsions and which are useful as the light absorbing means in the construction of light filters. These examples are not intended to limit my invention.

*Example 30. — 5-(3-ethyl-2(3)-benzothiazolylidene)-3-ethyl-2-(3-ethyl-4-oxo -2- thiono-5-thiazolylidene)-4-thiazolidone*

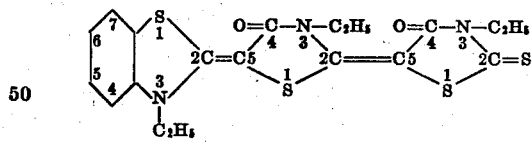

1.16 g. (1 mol.) of 5-(3-ethyl-2(3)-benzothiazolylidene)-2-methylmercapto - 4 - thiazolone ethiodide and 0.4 g. (1 mol.) of 3-ethylrhodanine were mixed together in 10 cc. of pyridine. The mixture was boiled, under reflux, for about one minute. Orange dye separated at once. The reaction mixture was chilled to 0° C., the dye filtered off, washed on the filter with methyl alcohol and dried in the air. 0.85 g. (76% yield) of dye were obtained. After recrystallization from pyridine (17 cc. per gram of dye), the dye was obtained as orange crystals, melting above 320° C. It sensitized a gelatino-silver-chloride emulsion strongly to 570 mu with maxima at 470 mu and 530 mu.

A dye was prepared in the same manner, using 2(1)-thionaphthenone instead of 3-ethylrhodanine, except that the reaction mixture was diluted with 50 cc. of methyl alcohol before chilling and filtering off the dye. After recrystallization from acetic acid (47 cc. per gram of dye), the dye was obtained as red crystals, melting, with decomposition, at 238° to 239° C. It sensitized a gelatino-silver-bromiodide emulsion out to 560 mu.

*Example 31.—3-ethyl-5 - (3-ethyl-2(3) -β-naphthoxazolylidene) -2-(3-ethyl-4-oxo-2-thiono-5-thiazolidylidene) -4-thiazolidone*

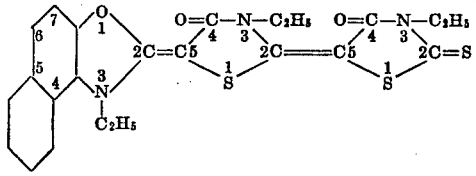

1.25 g. (1 mol.) of 5-(3-ethyl-2(3) -β-naphthoxazolylidene) -2-methylmercapto-4-thiazolone ethiodide, 0.4 g. (1 mol.) of 3-ethylrhodanine were mixed together in 10 cc. of pyridine. The mixture was boiled, under reflux, for one minute. Orange dye separated at once. The reaction mixture was chilled to 0° C., the dye filtered off, washed on the filter with methyl alcohol and finally dried in the air. 0.8 g. (67% yield) of dye were obtained. It was recrystallized from pyridine (25 cc. per gram of dye) and obtained as red crystals, melting, with decomposition, at 327° to 330° C. It sensitized a gelatino-silver-bromiodide emulsion to 580 mu, with a maximum at 530 mu.

*Example 32.—3-ethyl-5 -(1-ethyl-2(1) -quinolylidene) -2-(3-ethyl - 2-thiono - 4-oxo-5-thiazolidylidene) -4-thiazolidone*

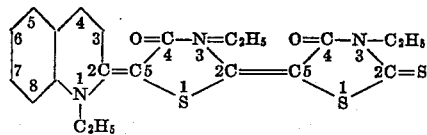

1.15 g. (1 mol.) of 5-(1-ethyl-2(1) -quinolylidene) -2-methylmercapto-4-thiazolone ethiodide, 0.4 g. (1 mol.) of 3-ethylrhodanine and 0.25 g. (1 mol.) of triethylamine were mixed together in 20 cc. of absolute ethyl alcohol. The mixture was boiled, under reflux, for 5 minutes. Red dye separated at once. The reaction mixture was chilled to 0° C., the dye filtered off, washed on the filter with methyl alcohol and finally dried in the air. 0.85 g. (77% yield) of dye were obtained. It was recrystallized from a 1:1 (volume) mixture of methyl alcohol and pyridine (50 cc. per gram of dye) and obtained as red crystals, melting, with decomposition, at 296° to 297° C. It sensitized a gelatino-silver-bromiodide emulsion to 640 mu with a maximum at 580 mu.

*Example 33.—3-ethyl-5-[3-ethyl - 2(3) -benzoxazolylidene) ethylidene]-2-(3-ethyl-4-oxo-2-thiono-5-thiazolidylidene) -4-thiazolidone*

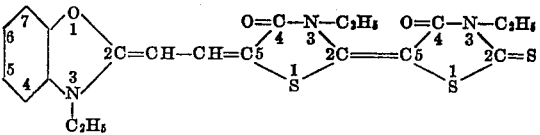

1.2 g. (1 mol.) of 5-[(3-ethyl-2(3)-benzoxazolylidene) ethylidene]-2 - methylmercapto - 4-thiazolone ethiodide, 0.4 g. (1 mol.) of 3-ethylrhodanine and 0.25 g. (1 mol.) of triethylamine were mixed together in 20 cc. of absolute ethyl alcohol. The mixture was boiled, under reflux, for 5 minutes. Dye separated at once. The reaction mixture was chilled to 0° C., the dye filtered off, washed on the filter with methyl alcohol and dried in the air. 0.9 g. (78% yield) of dye were obtained. It was recrystallized from pyridine (210 cc. per gram of dye) and obtained as red crystals, melting, with decomposition, at 338° to 340° C. It sensitized a gelatino-silver-bromiodide emulsion to 660 mu with a maximum at 610 mu.

A dye was prepared in the same manner, using 3-phenyl instead of 3-ethylrhodanine. After recrystallization from pyridine (165 cc. per gram of dye), it was obtained as green crystals, melting above 340° C. It sensitized a gelatino-silverbromiodide emulsion to 670 mu with a maximum at 600 mu.

A dye was prepared in the same manner, using 3-ethyl-2-thio-2,4(3,5) - oxazoledione instead of 3-ethylrhodanine. It was obtained, after recrystallization from pyridine (170 cc. per gram of dye) as red crystals, melting above 330° C. It sensitized a gelatino-silver-bromiodide emulsion to 640 mu with a flat maximum extending from 530 mu to 590 mu.

A dye was prepared in the same manner, using 2(1) -thionaphthenone instead of 3-ethylrhodanine. After recrystallization from acetic acid (45 cc. per gram of dye), it was obtained as dark red needles, melting, with decomposition, at 229° to 230° C. It sensitized a gelatino-silver-bromiodide emulsion to 640 mu with a maximum at 540 mu.

*Example 34.—5-[(3-ethyl-2(3) - benzoxazolylidene) ethylidene]-1,3-diphenyl-2 - (3-ethyl-2-thiono-4-oxo-5- thiazolidylidene) -4-imidazolidone*

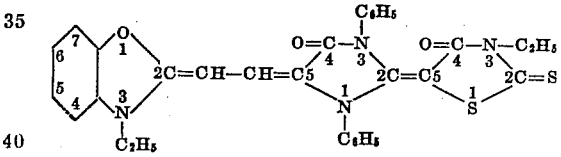

1.45 g. (1 mol.) of 5-[(3-ethyl-2(3)-benzoxazoylidene) ethylidene] - 2 - methylmercapto-1-phenyl-4-imidazolone - 3 - pheniodide, 0.4 g. (1 mol.) of 3-ethylrhodanine and 0.25 g. (1 mol.) of triethylamine were mixed in 20 cc. of absolute ethyl alcohol. The mixture was boiled, under reflux, for 5 minutes. Red dye separated at once. The reaction mixture was chilled to 0° C., the dye filtered off, washed with methyl alcohol and dried in the air. 0.9 g. (64% yield) of dye were obtained. It was recrystallized from pyridine (10 cc. per gram of dye) and obtained as green crystals, melting, with decomposition, at 263° to 265° C. It sensitized a gelatino-silver-bromiodide emulsion to 660 mu with a maximum at 580 mu.

*Example 35.—3-ethyl - 5-[(3 - ethyl-2(3) -benzothiazolylidene) isopropylidene] - (3 - ethyl - 4-oxo - 2 - thiono - 5 - thiazolidylidene) - 4(5) - oxazolone*

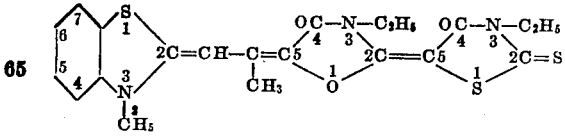

1.0 g. (1 mol.) of 3-ethyl-5-[(3-ethyl-2(3)-benzothiazolylidene) isopropylidene] - 2 - thio-2,4 (3,5) -oxazoledione and 1.1 g. (1 mol.+100% excess) of methyl-p-toluenesulfonate were mixed together and heated nearly to boiling, with stirring. The red viscous mass was cooled and dissolved in 10 cc. of pyridine. 1.0 g. (1 mol.+100% excess) of 3-ethylrhodanine were added to the pyridine solution. The resulting mixture was boiled for 5 minutes with stirring. The red solution was then poured into 200 cc. of cold water, whereupon the dye precipitated as a green solid. The dye was filtered off, washed with water and dried in the air. The dye was recrystallized from pyridine (30 cc. per gram of dye) and obtained in 37% yield as dark red crystals, melting, with decomposition, at 267° to 268° C. It sensitized a gelatino-silver-bromide emulsion strongly to 710 mu with a maximum at 600 mu.

Still further examples of the preparation of my new dyes represented by Formula IV above could be given, but the foregoing are believed to demonstrate the manner of practicing my invention.

Those of my new dyes represented by Formula IV above which can be represented by the following general formula:

V.
$$R-N{=}(L{=}L)_{d-1}{-}C{=}(L{-}L)_{n-1}{=}C \underset{Q}{\overset{Z}{\diagdown}} C{=\!\!=\!\!=}C \underset{Q}{\overset{O=C-N-R'}{\diagdown}} \underset{Q}{\overset{O=C-N-R''}{\diagdown}} C{=}S$$

wherein $d$, $n$, L, Q, R, R' and Z have the values set forth under Formula I above, and Q' represents oxygen, sulfur, an alkylimino group or an arylimino group and R'' represents an alkyl or an aryl group, can be condensed with esters (in the manner set forth for the compounds of Formula I) to give new quaternary salt substances of utility in the preparation of dyes of a complex nature and which sensitize photographic silver halide emulsions. The following example demonstrates the formation of these new quaternary salt intermediates.

*Example 36.*—5-[(5-3-ethyl-2(3)-benzothiazolylidene)-3-ethyl- 4 - oxo - 2 - thiazolidylidene-2-ethylmercapto-4-thiazolone ethoethylsulfate

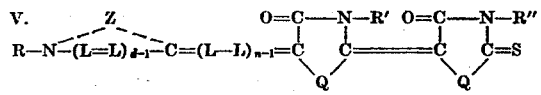

8.4 g. (1 mol.) of 4-(3-ethyl-2(3)-benzothiazolylidene)-3-ethyl-2-(3-ethyl-4-oxo-2 - thiono-5 - thiazolidylidene) - 4 - thiazolidone and 9 g. (3 mol.) of diethyl sulfate were mixed together. The mixture was heated at 160° C. for 3 hours. The resulting red viscous liquid was cooled and then stirred with acetone until crystalline. The crystalline product was filtered off, washed on the filter with acetone and dried in the air. 10 g. (90% yield) of quaternary salt were obtained. It was recrystallized from acetic acid (120 cc. per gram of salt) and obtained as red needles, melting, with decomposition, at 253° to 255° C.

The following examples demonstrate how these new quaternary salt intermediates can be used to prepare new dyes. In some of the following examples, the formation of the quaternary salt intermediate is shown. Where this is the case, the intermediate was used immediately upon preparation and without recrystallization, in order to avoid decomposition.

*Example 37.*—3 - ethyl-5 - (3 - ethyl-2(3)-benzothiazolylidene) - 2 -{3 - ethyl - 2-[(2 - quinolyl-ethiodide) methylene] - 4-oxo - 5 - thiazolidylidene}-4-thiazolidone

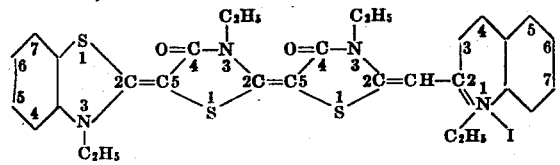

1.5 g. (1 mol.) of 5-[5-(3 - ethyl - 2(3)-benzothiazolylidene) - 3 - ethyl - 4 - oxo-2-thiazolidylidene]-2-ethylmercapto-4 - thiazolone ethoethylsulfate and 0.75 g. (1 mol.) of quinaldine ethiodide were mixed together in 15 cc. of pyridine. The mixture was boiled, under reflux, for 5 minutes. Green dye separated at once. The reaction mixture was chilled to 0° C., the dye filtered off, washed on the filter with acetone and water, and dried in the air. 0.6 g. (33% yield) of dye were obtained. After extraction with 50 cc. of boiling pyridine to remove impurities, the dye was obtained as green crystals, melting, with decomposition, at 289° to 290° C. It sensitized a gelatino-silver-bromiodide emulsion weakly to about 640 mu.

A dye was prepared in the same manner, using 2-methylbenzothiazole ethiodide instead of the quinaldine salt and boiling with 30 cc. of pyridine instead of 15 cc., and extracting with 100 cc. of boiling pyridine instead of 50 cc. The dye was obtained as red crystals, melting at 291° to 292° C. with decomposition.

*Example 38.*—*3-ethyl-5-[(3-ethyl-2(3)-benzoxazolylidene) ethylidene]-2-{3-ethyl-2-[(2-benzothiazolyl-ethiodide) methylene]-4-oxo-5-thiazolidylidene}-4-thiazolidone*

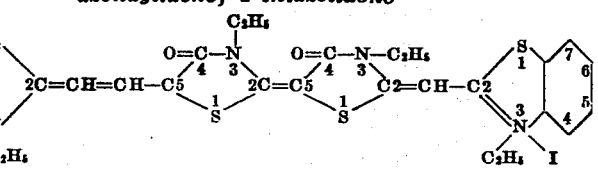

2.3 g. (1 mol.) of 3-ethyl-5-[(3-ethyl-2-(3)-benzoxazolylidene) ethylidene]-2-(3-ethyl-4-oxo-2 - thiono-5-thiazolidylidene)-4-thiazolidone and 0.8 g. (1 mol.) of diethyl sulfate were mixed together in a glass flask. The glass flask was then heated strongly in a bare flame for one minute. The reaction mixture was quickly chilled to 0° C. and 1.5 g. (1 mol.) of 2-methylbenzothiazole ethiodide and 15 cc. of pyridine were added thereto. The resulting mixture was boiled, under reflux, for two minutes. The reaction mixture was then chilled to 0° C., the dye filtered off, washed on the filter with methyl alcohol and dried in the air. It was extracted with three separate 100 cc. portions of boiling pyridine and obtained as a dark blue solid, melting, with decomposition, at 305° to 307° C. It sensitized a gelatino-silver-bromiodide emulsion strongly out to 710 mu with a maximum at 600 mu.

*Example 39.*—*3-ethyl-5-(3-ethyl-2(3)-benzothiazolylidene)-2-[3-ethyl-2-(3-ethyl-2-thiono-4-oxo - 5 - thiazolidylidene) - 4 - oxo - 5 - thiazolidylidene]-4-thiazolidone*

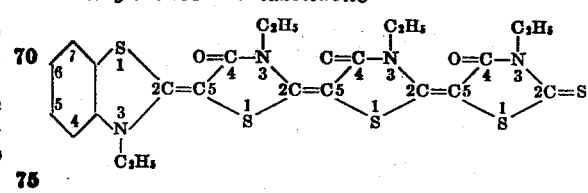

1.5 g. (1 mol.) of 5-[5-(3-ethyl-2(3)-benzothiazolylidene) - 3 - ethyl - 4 - oxo - 2 - thiazolidylidene-2-ethylmercapto-4 - thiazolone etho-ethylsulfate and 0.4 g. (1 mol.) of 3-ethylrhodanine were mixed together in 20 cc. of pyridine. The mixture was boiled, under reflux, for 5 minutes. Red dye separated at once. The reaction mixture was chilled to 0° C. The dye filtered off, washed on the filter with methyl alcohol and finally dried in the air. 1.1 g. (76% yield) of dye were obtained. It was extracted with 30 cc. of boiling pyridine to remove impurities and obtained as red flakes, melting above 330° C. It sensitized a gelatino-silver-chloride emulsion to 620 mu with a maximum at 565 mu.

The dye of the foregoing example can be converted into a quaternary salt substance by treatment with an ester and the quaternary salt substance can be employed to produce new dyes as illustrated in the following example.

*Example 40.*—3-ethyl-5-(3-ethyl-2(3)-benzothiazolylidene) - 2 - [3 - ethyl - 2 - {3 - ethyl - 2-[(2-benzothiazolyl-ethiodide) methylene]-4-oxo - 5 - thiazolidylidene} - 4 - oxo - 5 - thiazolidylidene]-4-thiazolidone

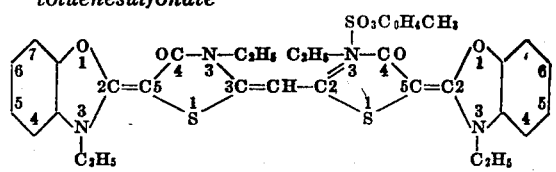

0.3 g. (1 mol.) of 3-ethyl-5-(3-ethyl-2(3)-benzothiazolylidene) - 2 - [3 - ethyl - 2 - (3 - ethyl-2-thiono-4-oxo-5-thiazolylidene)-4-oxo-5-thiazolylidene]-4-thiazolidone and 0.4 g. (3 mol.) of diethyl sulfate were mixed together and boiled for about one minute. The reaction mixture was quickly cooled and mixed with 0.5 g. (2 mol.) of 2-methylbenzothiazole ethiodide in 5 cc. of pyridine. The resulting mixture was boiled, under reflux, for 2 minutes. Green dye separated at once. The reaction mixture was chilled to 0° C., the dye filtered off, washed on the filter with methyl alcohol and dried in the air. 0.3 g. (68% yield) of dye were obtained. It was extracted with 200 cc. of boiling pyridine to remove impurities and obtained as green crystals, melting above 340° C. It sensitized a gelatino-silver-bromiodide emulsion moderately strongly out to 680 mu with a broad maximum at 590 mu.

I have further found that my new quaternary salts represented by Formula II above when $n$ represents one or two can be condensed with malonic acid to give new dyes, as illustrated in the following examples.

*Example 41.*—Bis-[3-ethyl-5-(3-ethyl-2(3)-benzoxazylidene)-thiazolone-4]-methinecyanine-p-toluenesulfonate

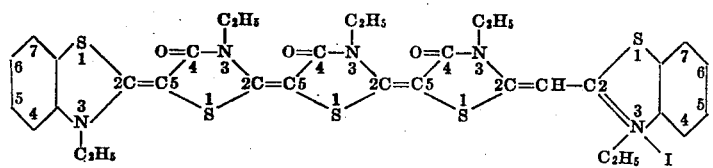

6.1 g. (2 mol.) of 3-ethyl-5-(3-ethyl-2(3)-benzoxazolylidene)-rhodanine and 7.4 g. (2 mol.+100% excess) of methyl-p-toluenesulfonate were heated at 135° to 140° C. for 2 hours. The reaction mixture was a viscous orange liquid. This was cooled and dissolved in 75 cc. of pyridine. To the resulting solution, 5 g. (1 mol.+400% excess) of malonic acid were added and the resulting mixture was heated on the steam bath for 45 minutes. The reaction mixture became red in color and carbon dioxide was evolved. The reaction mixture was chilled to 0° C., the dye filtered off, washed with acetone and then with water and dried. 5.6 g. (77% yield) of a dark red solid were obtained. The dye was recrystallized from methyl alcohol (20 cc. per gram of dye) and 4.9 g. were obtained as red crystals having a green reflex, melting with decomposition at 260° to 263° C. The dye had no sensitizing action.

*Example 42.*—Bis-[3-ethyl-5-{(3 - ethyl - 2 ( 3 ) - benzoxazolylidene) ethylidene} thiazolone - 4]-methinecyanine-p-toluenesulfonate

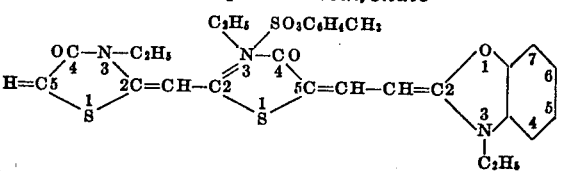

6.6 g. (2 mol.) of 3-ethyl-5-[(3-ethyl-2(3)-benzoxazolylidene) ethylidene]-rhodanine and 7.4 g. (2 mol.+100% excess) of methyl-p-toluenesulfonate were heated together at 135° to 140° C. for 2 hours. The reaction mixture formed a solid red cake. This was dissolved in 75 cc. of pyridine. To the resulting solution, 5 g. (1 mol.+400% excess) of malonic acid were added and the mixture was heated on a steam bath for 45 minutes. The mixture became dull green in color and carbon dioxide was evolved. The mixture was chilled to 0° C., washed with acetone, then water, and finally dried. 3.4 g. of coppery crystals were obtained. These were recrystallized from methyl alcohol (350 cc. per gram of dye) and 2.3 g. of dye were obtained as minute coppery crystals melting at 298 to 299° C. with decomposition. The dye had no sensitizing action.

In the preparation of photographic emulsions containing my new dyes, it is only necessary to disperse the dyes in the emulsions. The methods of incorporating dyes in emulsions are simple and well known to those skilled in the art. It is convenient to add the dyes from solutions in appropriate solvents. The solvent must, of course, be compatible with the emulsion and substantially free from any deleterious effect on the light-sensitive materials. Methanol has proven satisfactory as a solvent for the majority of my new dyes. Where the solubility of any dye in methyl alcohol is low, it is often advantageous to employ ethyl alcohol or acetone as the solvent. Even pyridine can be used as a solvent for the very insoluble dyes. However, the use of pyridine in photographic emulsions is not to be recommended. Ordinarily, it is advantageous to incorporate the dyes in the finished, washed emulsion. The dyes should, of course, be uniformly distributed throughout the emulsion.

The concentration of my new dyes in the emulsion can vary widely, i. e. from about 5 to about 100 mg. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making. To prepare a gelatino-silver-halide emulsion, the following procedure is satisfactory.

A quantity of the dye is dissolved in methyl alcohol or other suitable solvent and a volume of this solution (which may be diluted with water) containing from 5 to 100 mg. of dye is slowly added to about 1000 cc. of a gelatino-silver-halide emulsion, with stirring. Stirring is continued until the dye is uniformly distributed throughout the emulsion. Wtih most of my new dyes, 10 to 20 mg. of dye per liter of emulsion suffices to produce the maximum sensitizing effect with the ordinary gelatino - silver - bromide (including bromiodide) emulsions. With extremely fine-grain emulsions, which include most of the ordinarily employed gelatino-silver-chloride emulsions, somewhat larger concentrations of dye may be necessary to secure the optimum sensitizing effect.

The above statements are only illustrative and not to be understood as limiting my invention in any sense, as it will be apparent that my dyes can be incorporated by other methods in many of the photographic emulsions customarily employed in the art, such, for instance, as by bathing a plate or film, upon which the emulsion has been coated, in a solution of the dye in an appropriate solvent. The bathing methods, however, are not to be preferred ordinarily.

What I claim as my invention and desire to be secured by Letters Patent of the United States is:

1. A process for preparing a dye comprising heating, in nitrobenzene, an alkyl salt with a merocyanine dye characterized by the following general formula:

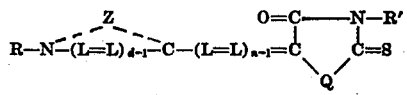

wherein $d$ represents a positive integer of from one to two, $n$ represents a positive integer of from one to three, L represents a methine group, Q represents a group selected from the group consisting of oxygen, sulfur, alkylimino groups and arylimino groups, R represents an alkyl group, R' represents a group selected from the group consisting of alkyl and aryl groups, and Z represents the non-metallic atoms necessary to complete a heterocyclic organic nucleus.

2. A process for preparing a dye comprising heating, in nitrobenzene, an alkyl-p-toluenesulfonate with a merocyanine dye characterized by the following general formula:

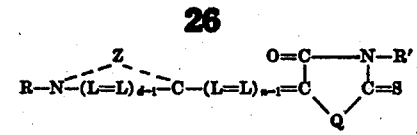

wherein $d$ represents a positive integer of from one to two, $n$ represents a positive integer of from one to three, L represents a methine group, Q represents a group selected from the group consisting of oxygen, sulfur, alkylimino groups and arylimino groups, R represents an alkyl group, R' represents a group selected from the group consisting of alkyl and aryl groups, and Z represents the non-metallic atoms necessary to complete a heterocyclic organic nucleus.

3. A process for preparing a dye comprising heating, in nitrobenzene, methyl-p-toluenesulfonate with a merocyanine dye characterized by the following formula:

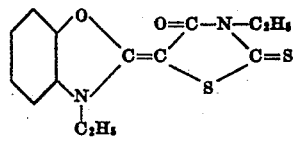

4. A process for preparing a dye comprising heating, in nitrobenzene, methyl-p-toluenesulfonate with a merocyanine dye characterized by the following formula:

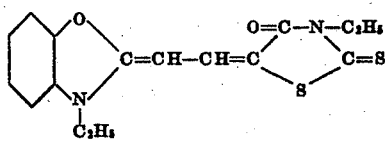

5. A process for preparing a dye comprising heating, in nitrobenzene, methyl-p-toluenesulfonate with a merocyanine dye characterized by the following formula:

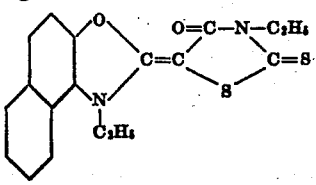

LESLIE G. S. BROOKER.

REFERENCES CITED

The following references are of record in the file of this patent:

UNITED STATES PATENTS

| Number | Name | Date |
|---|---|---|
| 2,089,729 | Brooker | Aug. 10, 1937 |
| 2,161,331 | Brooker | June 6, 1939 |

FOREIGN PATENTS

| Number | Country | Date |
|---|---|---|
| 832,352 | France | June 27, 1938 |